United States Patent
Chiu

(10) Patent No.: US 6,986,203 B2
(45) Date of Patent: Jan. 17, 2006

(54) MANUFACTURING METHOD FOR A COMPOSITE COIL SPRING

(75) Inventor: Chang-Hsuan Chiu, Daya (TW)

(73) Assignee: Union Composites Co., Ltd., Taichung (TW)

( * ) Notice: Subject to any disclaimer, the term of this patent is extended or adjusted under 35 U.S.C. 154(b) by 0 days.

(21) Appl. No.: 10/807,110

(22) Filed: Mar. 24, 2004

(65) Prior Publication Data

US 2005/0210676 A1    Sep. 29, 2005

(51) Int. Cl.
B21F 3/02    (2006.01)

(52) U.S. Cl. .............. 29/896.9; 29/896.91; 29/896.92; 29/896.93; 148/580; 264/281; 264/313; 425/577

(58) Field of Classification Search .............. 29/896.6, 29/896.61, 896.62, 896.9, 896.91, 896.93, 29/902, 903, 33 F, 34 D, 896.92, 905; 148/580, 148/516, 908; 425/577, 547; 264/281, 285, 264/313, 318

See application file for complete search history.

(56) References Cited

U.S. PATENT DOCUMENTS

| | | | | |
|---|---|---|---|---|
| 2,356,662 A | * | 8/1944 | Endsley | 72/142 |
| 2,555,310 A | * | 6/1951 | Beltz | 266/274 |
| 3,973,311 A | * | 8/1976 | Harnsberger | 29/434 |
| 4,182,738 A | * | 1/1980 | Casaert et al. | 264/210.2 |
| 4,283,823 A | * | 8/1981 | Buswell | 29/890.12 |
| 4,475,723 A | * | 10/1984 | Meyer | 267/47 |
| 5,152,948 A | * | 10/1992 | Lizenby | 264/242 |
| 5,395,469 A | * | 3/1995 | Suggs et al. | 156/173 |
| 5,403,537 A | * | 4/1995 | Seal et al. | 264/511 |
| 5,454,150 A | * | 10/1995 | Hinke et al. | 29/896.9 |
| 5,558,393 A | * | 9/1996 | Hawkins et al. | 267/162 |
| 6,016,595 A | * | 1/2000 | Dysarz | 29/423 |
| 6,068,250 A | * | 5/2000 | Hawkins et al. | 267/162 |
| 6,435,485 B1 | * | 8/2002 | Greco | 267/36.1 |
| 6,550,301 B2 | * | 4/2003 | Hasegawa | 72/138 |
| 6,648,996 B2 | * | 11/2003 | Hasegawa | 148/580 |
| 6,836,964 B2 | * | 1/2005 | Hasegawa et al. | 29/896.9 |
| 6,922,895 B1 | * | 8/2005 | Whitworth | 29/896.92 |
| 2003/0075831 A1 | * | 4/2003 | Venus et al. | 264/318 |

* cited by examiner

Primary Examiner—Essama Omgba
(74) Attorney, Agent, or Firm—Rosenberg, Klein & Lee

(57) ABSTRACT

A manufacturing method for a composite coil spring includes the following steps: preparing a mold, winding a coil former around a mandrel of the mold, winding composite material pre-preg, compressing and heating, opening the mold and detaching the mandrel and the coiled coil former.

6 Claims, 8 Drawing Sheets

MANUFACTURING METHOD FOR A COMPOSITE COIL SPRING

BACKGROUND OF THE INVENTION

1. Field of the Invention

The present invention relates to a manufacturing method, and more particularly to a manufacturing method for a composite coil spring.

2. Description of Related Art

A conventional coil spring is usually made of spring steel. The conventional coil spring uses the restitution force of the steel material for longitudinally absorbing the vibration. Consequently, the coil spring is widely used in a machine, a vehicle or a bicycle.

For example, in a bicycle, the main frame, the felly and all the elements of the bicycle are gradually altered for a light gravity to promote an exercise effect. Consequently, various alloys are used to make the main frame of the felly of the bicycle, such as aluminum alloy, magnesium alloy, titanium alloy and the like. Sometimes, the carbon fiber is also used. However, only the coil spring is still made of spring steel. The steel coil spring is heavy, and the steel coil spring may cause an aftershock when used in a bicycle for absorbing vibration.

Furthermore, the steel coil spring cannot absorb the vibration therefrom so that the absorber usually has a damping for absorbing the vibration form the steel coil spring. Consequently, the total weight of the absorber is raised.

For solving the above problem, some composite coil is developed. With reference to FIG. 10, the conventional composite coil spring (50) has two hook (51) respectively inwardly extending from two opposite ends of the composite coil spring (50). Consequently, a complicated mold is necessary for manufacturing the composite coil spring (50) with two hooks (51). The composite coil spring may be broken when opening the mold because the composite coil spring cannot load a great transformation rate due to the property thereof. Consequently, the manufacturing method of composite coil spring needs to be advantageously altered.

With reference to FIGS. 11 to 13, a column mold (60) is provided to manufacture the composite coil spring. The mold (60) has a continual spiral groove (61) defined in an outer periphery of the mold (60) for receiving the composite material (62). However, the mold is unique to the corresponding composite coil spring. Consequently, the manufacturer needs to prepare different molds for various composite coil springs. As a result, the manufacturing cost is raised due to the molds.

The present invention has arisen to mitigate and/or obviate the disadvantages of the conventional manufacturing method for a composite coil spring.

SUMMARY OF THE INVENTION

The main objective of the present invention is to provide an improved manufacturing method for a composite coil spring having no molding line formed thereon.

To achieve the objective, the manufacturing method for a composite coil spring in accordance with the present invention comprises the following steps:

preparing a mold that includes a first connecting seat, a first cylinder connecting to the first connecting seat, a second cylinder partially movably received in the first cylinder, an mandrel movably received in the second cylinder and the first cylinder, and a second connecting seat mounted to the second cylinder opposite to the first connecting seat;

winding a coil former around the mandrel: a coil former previously spirally wound on the mandrel to define a coil groove;

winding composite material pre-preg: a composite material pre-preg being disposed in the coiled groove defined by the coil former;

compressing and heating: the mandrel with the coil former and the composite material pre-preg being inserted into the first cylinder, the coil former and the composite material pre-preg being received between the mandrel and an inner periphery of the first cylinder, the second connecting seat and the second cylinder being moved toward the first connecting seat to compress the coil former and the composite material pre-preg when the mold is heated; and open the mold: the second connecting seat being moved apart from the first connecting seat with the second cylinder and the mandrel to make the coil former and composite material pre-preg be detached from the first cylinder; and a detaching the mandrel and the coil former: the mandrel longitudinally drawn out from the composite material pre-preg and the coil former due to the second connecting seat and the second cylinder, the coil former being detached from the composite material pre-preg when the composite material pre-preg is hardened and detached from the mandrel.

Further benefits and advantages of the present invention will become apparent after a careful reading of the detailed description with appropriate reference to the accompanying drawings.

DETAILED DESCRIPTION OF THE INVENTION

Figure 1:
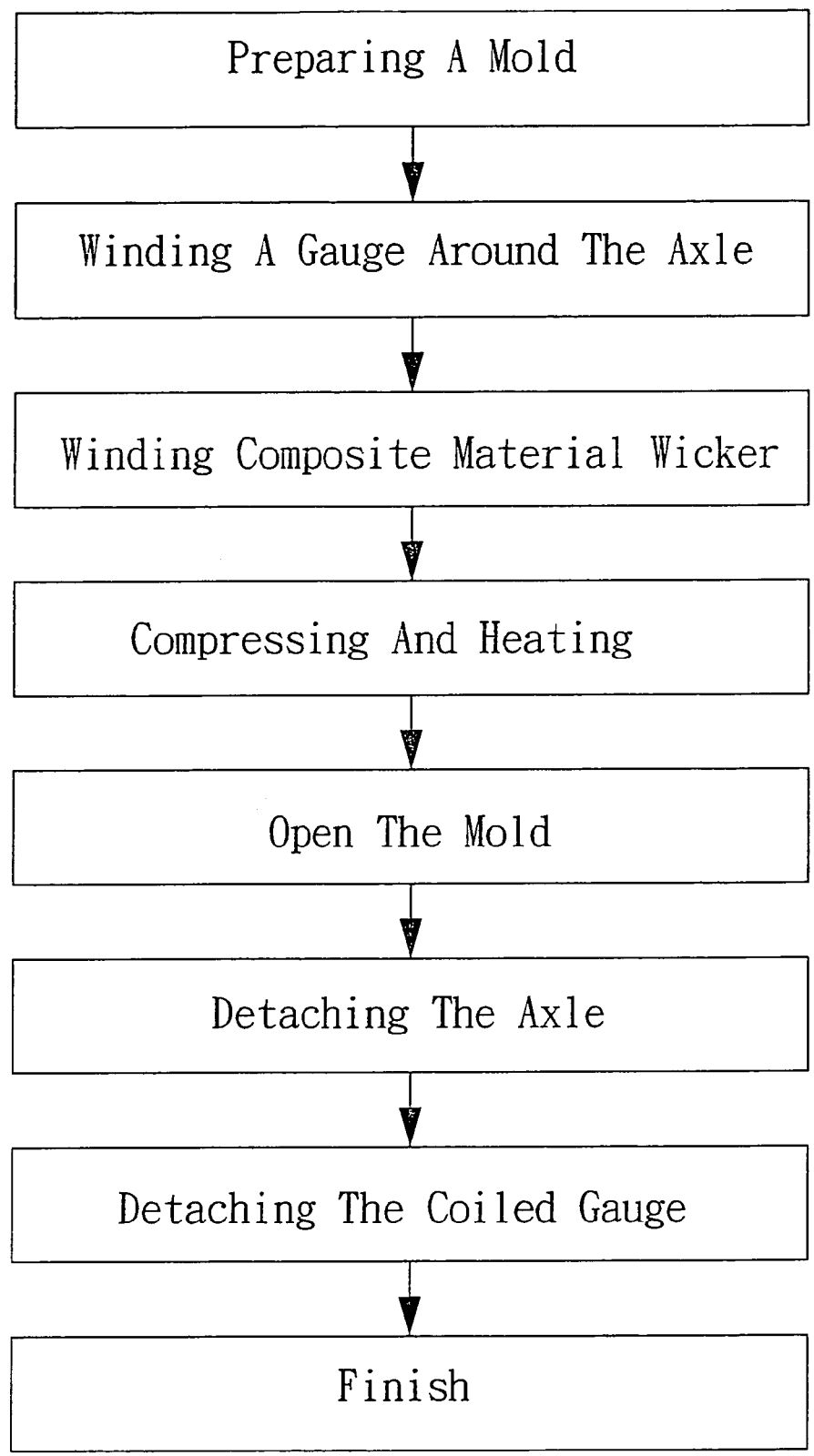
FIG. 1 is a flow chart of a manufacturing method for a composite spring in accordance with the present invention.
Figure 2:
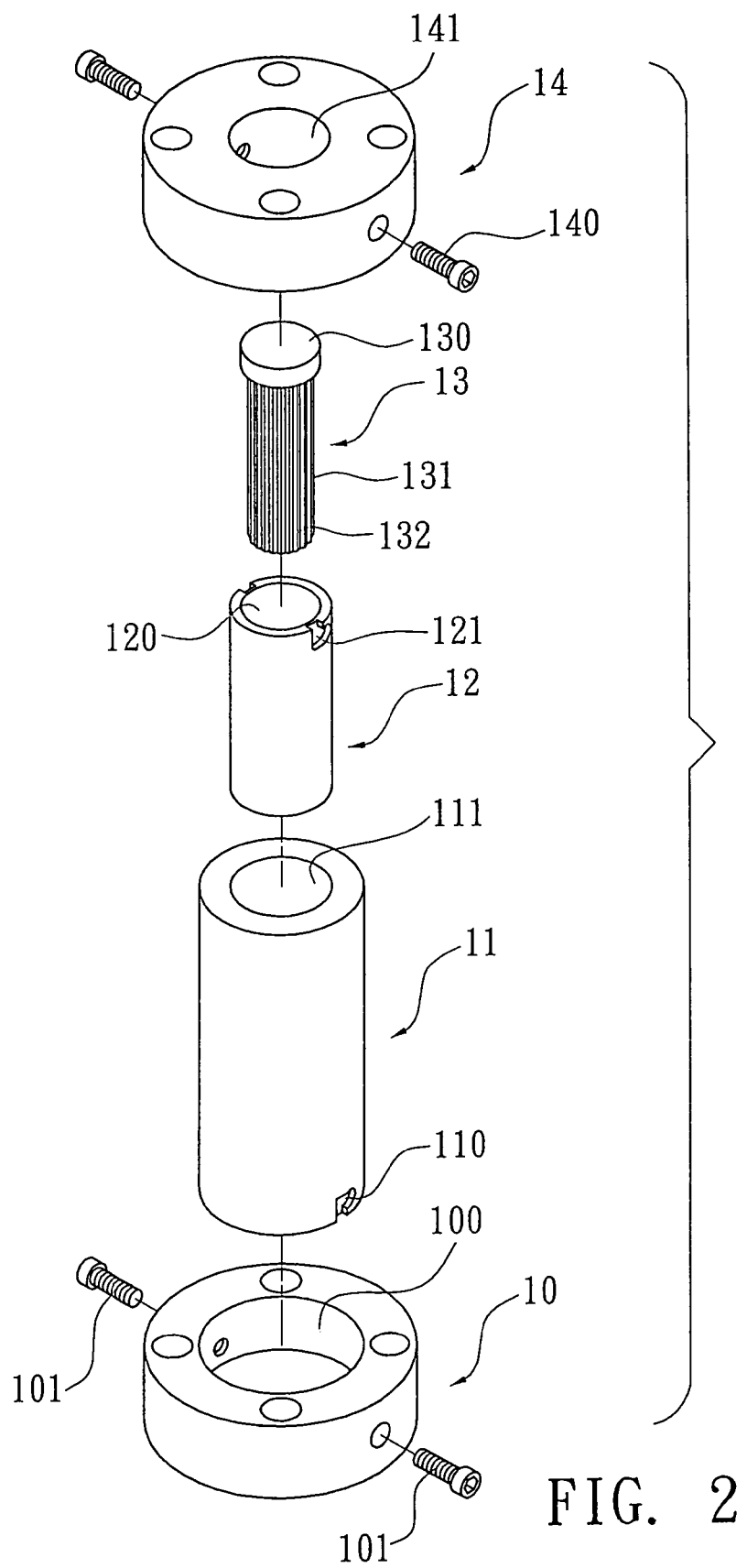
FIG. 2 is an exploded perspective view of a mold of the manufacturing method of the present invention.
Figure 3:
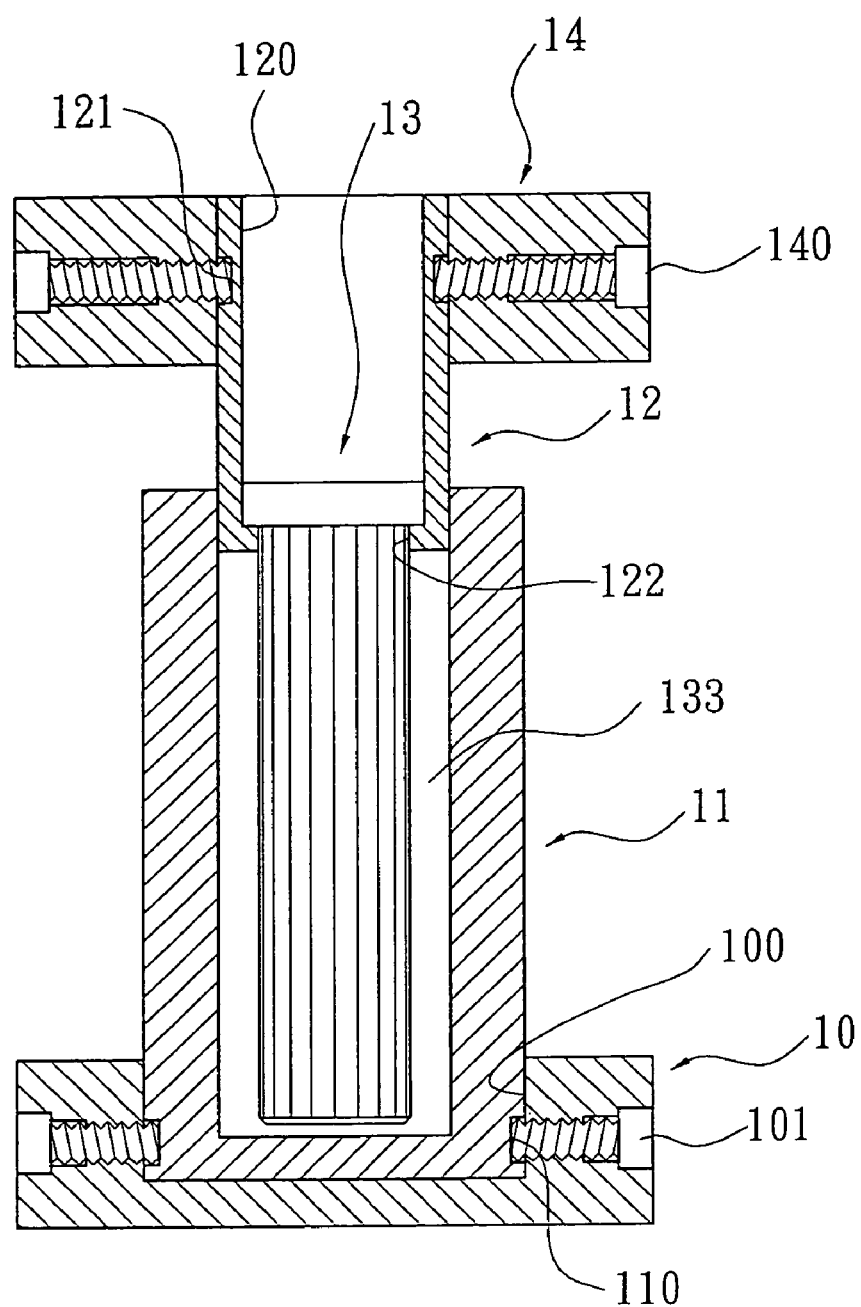
FIG. 3 is a cross-sectional view of the mold in FIG. 2.

Referring to the drawings and initially to FIGS. 1–3, a manufacturing method for a composite coil spring in accordance with the present invention comprises the following steps.

Figure 4:
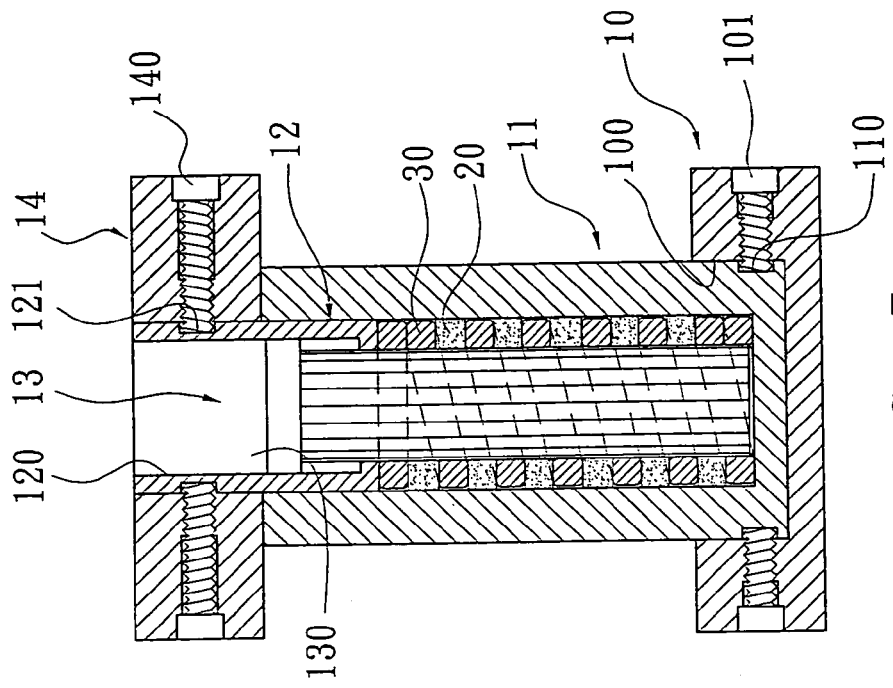
FIG. 4 is an operational view of the mold in FIG. 3 before being compressed.
Figure 5:
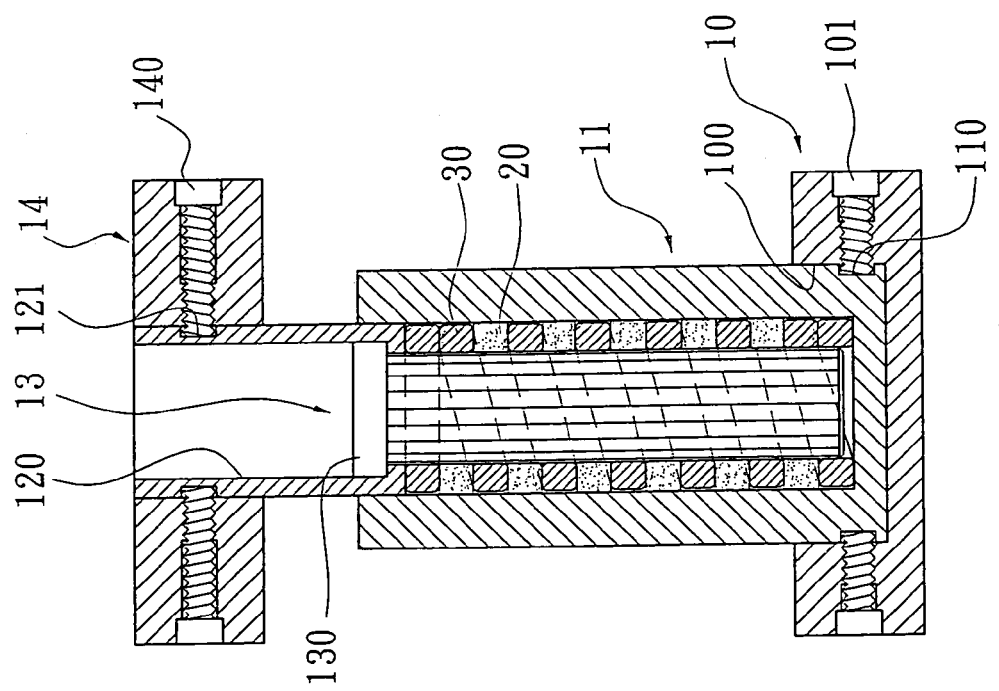
FIG. 5 is an operational view of the mold in FIG. 3 after being compressed.
Figure 8:
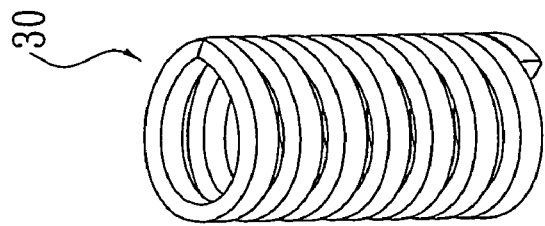
FIG. 8 is a perspective of the composite coil spring that is made of the manufacturing method in accordance with the present invention.
Figure 7:
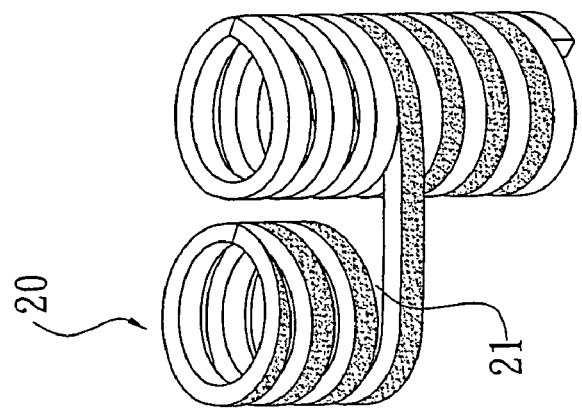
FIG. 7 is a perspective of the coil former and the composite coil spring for showing the coil former being detached from the composite coil spring that is made of the manufacturing method of the present invention.
Figure 6:
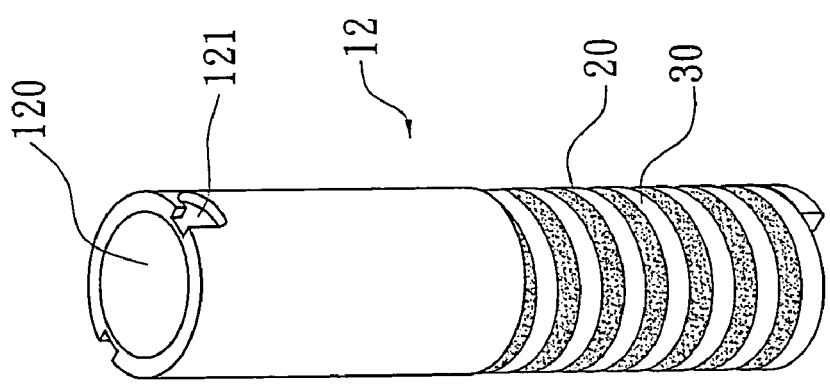
FIG. 6 is a perspective view of the second cylinder and the mandrel of the present invention with the semi-finished composite coil spring, wherein the mandrel is partially longitudinally received and extends through second cylinder into the semi-finished composite coil spring.

1. Preparing a mold: the mold comprises a first connecting seat (10) having a cavity (100) centrally defined in the first connecting seat (10). Two bolts (101) respectively radially extend into the cavity (100) and diametrically correspond to each other. A first cylinder (11) has a first end received in the cavity (100) in the first connecting seat (10) and two L-shaped recesses (110) defined in an outer periphery of the first end of the first cylinder (11). Each recess (110) aligns with a corresponding one of the two bolts (101). A free end of each of the two bolts (101) securely abuts a bottom of each of the two recesses (110) to hold the first cylinder (11) in place. A blind hole (111) is centrally longitudinally defined in the first cylinder (11). A second cylinder (12) is partially slidably received in the blind hole (111) in the first cylinder (11). A passage (120) is centrally longitudinally defined in and extends through the second cylinder (12). The second cylinder (12) includes a first end having an annular lip (122) inwardly radially extending therefrom and a second end having two recesses (121) respectively defined in an outer periphery of the second end of the second cylinder (12). The two recesses (121) diametrically correspond to each other. An mandrel (13) is slidably received in the passage (120) in the second cylinder (12). The mandrel (13) has an enlarged head (130) and a shank (131) centrally extending from the head (130) of the mandrel (13). The enlarged head (130) is selectively engaged to the annular lip (122) of the second cylinder (12) and the shank (131) extends through the passage (120) in the second cylinder (12) into the blind hole (111) in the first cylinder (11) to form a empty space (133) between the mandrel (13) and an inner periphery of the blind hole (111) in the first cylinder (11). The mandrel (13) has multiple grooves (132) longitudinally defined in an outer periphery of the shank (131) and being parallel relative to an axis of the mandrel (13). A second connecting seat (14) is sleeved on the second end of the second cylinder (12). The second connecting seat (14) has a through hole (141) centrally defined therein for receiving the second end of the second cylinder (12). Two screws (140) respectively radially extend into the through hole (141) and diametrically correspond to each other. Each screw (140) has a free end abutting a bottom of a corresponding one of the two recesses (121) to hold the second connecting seat (14) in place.
2. Winding a coil former around the mandrel (13): a coil former (20) is previously spirally wound on the shank (131) of the mandrel (13) to define a coiled groove (21) as shown in FIG. 6. In the preferred embodiment of the present invention, the coil former (20) is made of elastomer.
3. Winding composite material pre-preg (30): a composite material pre-preg (30) is disposed in the coiled groove (21) defined by the coil former (20).
4. Compressing and heating: with reference to FIGS. 4 and 5, the mandrel (13) with the coil former (20) and the composite material pre-preg (30) is inserted into the fist passage (111) in the first cylinder (11), and the coil former (20) and the composite material pre-preg (30) are received in the empty space (133). The second connecting seat (14) and the second cylinder (12) are moved toward the first connecting seat (11) to compress the coil former (20) and the composite material pre-preg (30) when the mold is heated. The composite material pre-preg (30) is hardened in the empty space (133) due to a high pressure and a high temperature. However, the composite material pre-preg (30) may be broken when being overly compressed. The multiple grooves (132) in the mandrel (13) and the coil groove (21) can absorb some of the transformation of the composite material pre-preg (30) for mitigating the above problem of break.
5. Open the mold: with reference to FIG. 6, the second connecting seat (14) is moved apart from the first connecting seat (10) with the second cylinder (12) and the mandrel (13) to make the coil former (20) and the composite material pre-preg (30) be detached from the first cylinder (11).
6. Detaching the mandrel (13): the mandrel (13) is longitudinally drawn out from the hardened composite material pre-preg (30) and the coiled coil former (20) due to the second connecting seat (14) and the second cylinder (12).
7. Detaching the coiled coil former (20): with reference to FIG. 7, the coiled coil former (20) is detached from the composite material pre-preg (30) when the composite material pre-preg (30) is hardened and detached from the mandrel (13).
8. Finish: with reference to FIG. 8, the composite coil spring is complete formed by the hardened composite material pre-preg (30) after detaching the coiled coil former (20) from the hardened composite material pre-preg (30).

Figure 9:
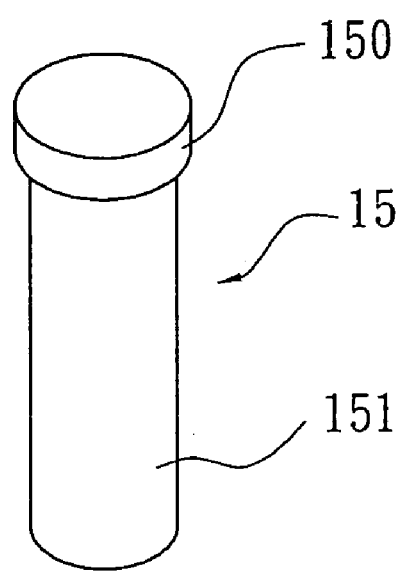
FIG. 9 is a perspective view of a second embodiment of the mandrel of the mode in FIG. 2.
Figure 10:
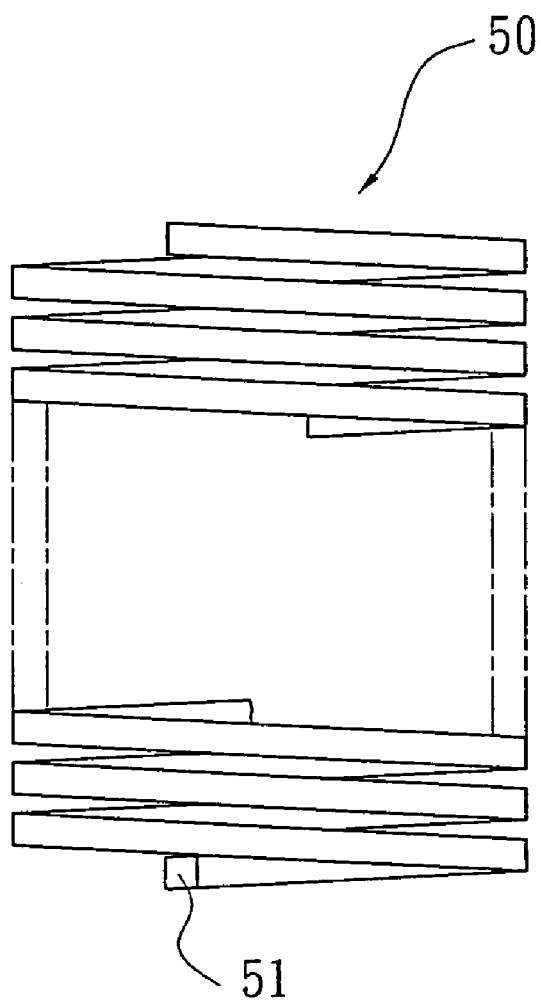
FIG. 10 is a perspective view of a conventional composite coil spring in accordance with the prior art.
Figure 11:
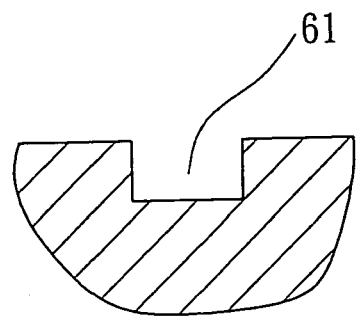
FIG. 11 is a plan view of a conventional mold for manufacturing a composite coil spring.
Figure 12:
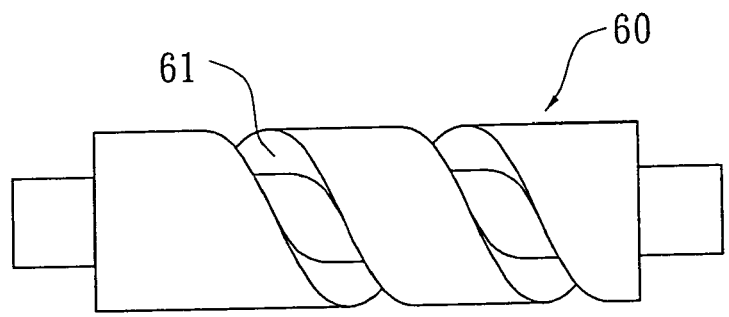
FIG. 12 is a partial cross-sectional view of the mold in FIG. 11.
Figure 13:
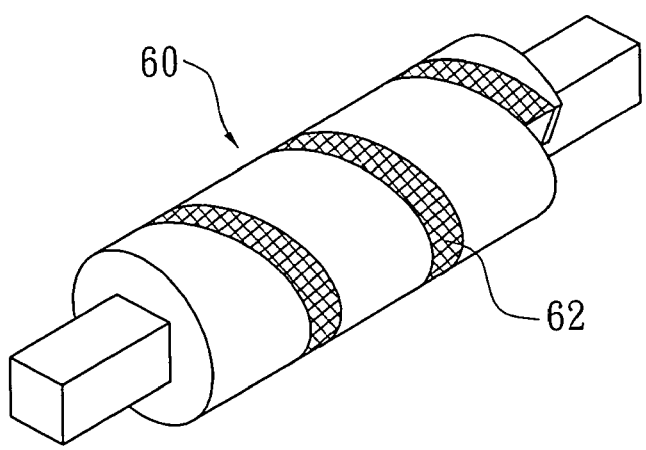
FIG. 13 is a perspective view of the mold in FIG. 11 when the composite material pre-preg is wound in the groove in the outer periphery of the mold in FIG. 11.

With reference to FIG. 9, a second embodiment of the mandrel (15) of the mold for the manufacturing method in accordance with the present invention is shown. The mandrel (15) has an enlarged head (150) and a shank (151) centrally extending from the enlarged head (150). The shank (151) has a smooth outer periphery.

As described above, the manufacturing method for a composite coil spring in accordance with the present invention comprises the follow advantages.

1. The composite coil spring made of the manufacturing method of the present invention has no parting line formed on the outer periphery thereof so that the composite coil spring would not cause a phenomenon stress concentration.
2. The manufacturing processes are simplified. The composite coil spring made by the present invention has two opposite plane ends due to the bottom of the blind hole (111) in the first cylinder (11) and the first end of the second cylinder (12).
3. When manufacturing a composite coil spring having a different specification, the operator only needs to replace the second cylinder (12) and the mandrel (13) in accordance with the outer diameter, the inner diameter and the thickness of the composite coil spring. Consequently, the cost for preparing the molds to manufacture the composite coil spring is reduced.

Although the invention has been explained in relation to its preferred embodiment, it is to be understood that many other possible modifications and variations can be made without departing from the spirit and scope of the invention as hereinafter claimed.

What is claimed is:

1. A manufacturing method for a composite coil spring comprising the following steps:

preparing a mold that includes a first connecting seat, a first cylinder connecting to the first connecting seat, a second cylinder partially movably received in the first cylinder, a mandrel movably received in the second cylinder and the first cylinder, and a second connecting seat mounted to the second cylinder opposite to the first connecting seat;

spirally winding a coil former around the mandrel to define a coil groove;

winding composite material pre-preg on the mandrel such that the composite material pre-preg is disposed in the coiled groove defined by the coil former;

inserting the mandrel with the coil former and the composite material pre-preg into the first cylinder, the coil former and the composite material pre-preg being received between the mandrel and an inner periphery of the first cylinder, moving the second connecting seat and the second cylinder toward the first connecting seat to compress the coil former and the composite material pre-preg when the mold is heated;

opening the mold by moving apart the second connecting seat from the first connecting seat with the second cylinder and the mandrel so as to withdraw the coil former and composite material pre-preg from the first cylinder; and longitudinally drawing out the mandrel from the composite material pre-preg and the coil former by pulling the second connecting seat and the second cylinder, detaching the coil former from hardened composite material pre-preg.

2. The manufacturing method as claimed in claim 1, wherein:

the first connecting seat comprises a cavity centrally defined therein and two bolts laterally extending into the cavity, the two bolts respectively diametrically corresponding to each other;

the first cylinder has two recesses defined in an outer periphery of a first end of the first cylinder and diametrically corresponding to each other, the first end of the first cylinder received in the cavity in the first connecting seat, each bolt extending into a corresponding one of the two recesses to hold the first cylinder in place;

the second connecting seat has a through hole centrally defined therein for receiving an upper end of the second cylinder and two screws laterally extend into the through hole in the second connecting seat, the two screws diametrically corresponding to each other; and the second cylinder has two recesses defined in an outer periphery of the upper end of the second cylinder and diametrically corresponding to each other, each screw extending into a corresponding one of the two recesses in the second cylinder to hold the second cylinder in place.

3. The manufacturing method as claimed in claim 2, wherein the second cylinder comprises a passage centrally longitudinally defined therein and extending through the second cylinder, and an annular lip inwardly radially extending from an inner periphery of the passage, the mandrel including an enlarged head and shank centrally extending from the enlarged head, the enlarged head selectively engaged to the annular lip of the second cylinder to prevent the mandrel from detaching from the second cylinder.

4. The manufacturing method as claimed in claim 3, wherein the mandrel comprises multiple grooves longitudinally defined in an outer periphery of the shank of the mandrel and being parallel relative to an axis of the mandrel, the multiple grooves being provided to absorb some of the transformation of the composite material pre-preg for mitigating a problem of breaking of the composite coil spring during molding.

5. The manufacturing method as claimed in claim 1, wherein the second cylinder comprises a passage centrally longitudinally defined therein and extending through the second cylinder, and an annular lip inwardly radially extending from an inner periphery of the passage, the mandrel including an enlarged head and shank centrally extending from the enlarged head, the enlarged head selectively engaged to the annular lip of the second cylinder to prevent the mandrel from detaching from the second cylinder.

6. The manufacturing method as claimed in claim 5, wherein the mandrel comprises multiple grooves longitudinally defined in an outer periphery of the shank of the mandrel and being parallel relative to an axis of the mandrel, the multiple grooves being provided to absorb some of the transformation of the composite material pre-preg for mitigating a problem of breaking of the composite coil spring during molding.

* * * * *